United States Patent
Farkas et al.

(10) Patent No.: US 9,906,411 B2
(45) Date of Patent: *Feb. 27, 2018

(54) METHODS AND APPARATUS FOR DETECTING AND HANDLING SPLIT BRAIN ISSUES IN A LINK AGGREGATION GROUP

(71) Applicant: Telefonaktiebolaget LM Ericsson (publ), Stockholm (SE)

(72) Inventors: János Farkas, Kecskemét (HU); Balázs Peter Gerö, Budapest (HU); Panagiotis Saltsidis, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/463,292

(22) Filed: Mar. 20, 2017

(65) Prior Publication Data

US 2017/0195177 A1 Jul. 6, 2017

Related U.S. Application Data

(63) Continuation of application No. 14/400,619, filed as application No. PCT/IB2012/054444 on Aug. 29, 2012, now Pat. No. 9,602,348.

(Continued)

(51) Int. Cl.
*H04L 12/24* (2006.01)
*H04L 12/709* (2013.01)
*H04L 12/26* (2006.01)

(52) U.S. Cl.
CPC ...... *H04L 41/0816* (2013.01); *H04L 41/0672* (2013.01); *H04L 43/0811* (2013.01); *H04L 45/245* (2013.01)

(58) Field of Classification Search
None
See application file for complete search history.

(56) References Cited

U.S. PATENT DOCUMENTS

| | | | |
|---|---|---|---|
| 8,650,286 B1 | 2/2014 | Sajassi et al. | |
| 2002/0110148 A1* | 8/2002 | Hickman | H04L 45/00 370/475 |

(Continued)

FOREIGN PATENT DOCUMENTS

| | | |
|---|---|---|
| EP | 2701342 A1 | 2/2014 |
| JP | 2002354549 A | 12/2002 |

(Continued)

OTHER PUBLICATIONS

Finn, N., "Graceful Name Change in LACP", IEEE Draft, May 11, 2011, pp. 1-7, retrieved on Nov. 4, 2014, retrieved from internet: www.ieee802.org/1/.../axbq-nfinn-graceful-name-change-0511-v1.pdf.

(Continued)

*Primary Examiner* — Jamaal Henson
(74) *Attorney, Agent, or Firm* — Coats & Bennett, PLLC

(57) ABSTRACT

Methods and apparatus for operating a virtual node in a LAG that includes a first virtual node and a second virtual node are disclosed. The first virtual node includes at least a first fellow node and a second fellow node. In one exemplary method, the first fellow node receives, from the second virtual node, first control information comprising a system ID and first configuration information associated with the LAG. The first control information is compared with reference configuration information representing previously established expected configuration information associated with the LAG. Based on that comparison, and at least one additional criterion, a split brain condition may be determined to exist in the LAG. In a complementary fashion, a fellow node of the second virtual node may be configured to (Continued)

alter its transmitted configuration information depending on whether it is able to communicate with its fellow node in the second virtual node.

16 Claims, 15 Drawing Sheets

Related U.S. Application Data

(60) Provisional application No. 61/647,211, filed on May 15, 2012.

(56) References Cited

U.S. PATENT DOCUMENTS

| | | |
|---|---|---|
| 2002/0137498 A1 | 9/2002 | Goss et al. |
| 2009/0109998 A1 | 4/2009 | Vinayagam et al. |
| 2012/0106322 A1* | 5/2012 | Gero .................... H04L 12/437 370/225 |
| 2012/0182866 A1 | 7/2012 | Vinayagam et al. |
| 2013/0246635 A1* | 9/2013 | Gero .................... H04L 41/0654 709/227 |

FOREIGN PATENT DOCUMENTS

| | | |
|---|---|---|
| JP | 2009194464 A | 8/2009 |
| WO | 2013127416 A1 | 9/2013 |

OTHER PUBLICATIONS

Haddock, S, et al., "Resilient Network Interconnect using Distributed Link Aggregation", IEEE Draft, Sep. 16, 2010, pp. 1-40, version 3b, retrieved on Nov. 4, 2011, retrieved from internet: http://www.ieee802.org/1/files/public/docs2010/new-haddock-resilient-network-interconnect-LAG-0810-v2.pdf.

Farkas, J., "Resilient Network Interconnect Functionalities", IEEE Draft, Sep. 16, 2010, pp. 1-13, retrieved on Nov. 4, 2011, retrieved from internet:http://www.ieee802.org/1/files/public/docs2010/new-farkas-network-interconnect-functionalities-0910-v01.pdf.

IEEE Computer Society, "Standard for Local and metropolitan area networks—Link Aggregation", Nov. 3, 2011, pp. 1-163, IEEE Std 802.1AX™-2008, IEEE.

IEEE Computer Society, "Link Aggregation—Amendment: Distributed Resilient Network Interconnect", P802.1AXbq™/D0.4, Nov. 3, 2011, pp. 1-102, IEEE.

Haddock, S., "Resilient Network Interconnect: Requirement for a Single Portal Address", Extreme Networks, Nov. 22, 2010, pp. 1-13, Version 1.

* cited by examiner

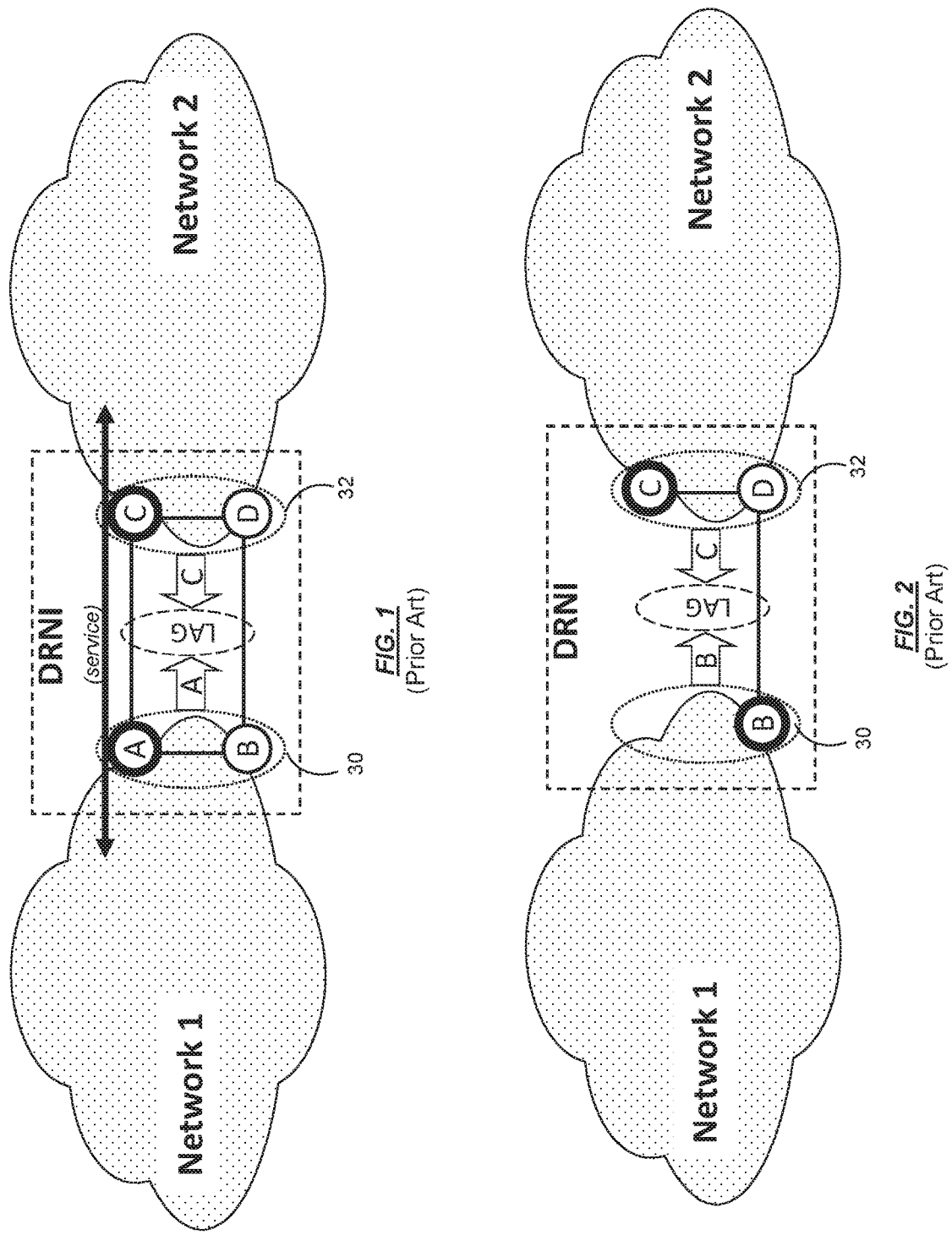

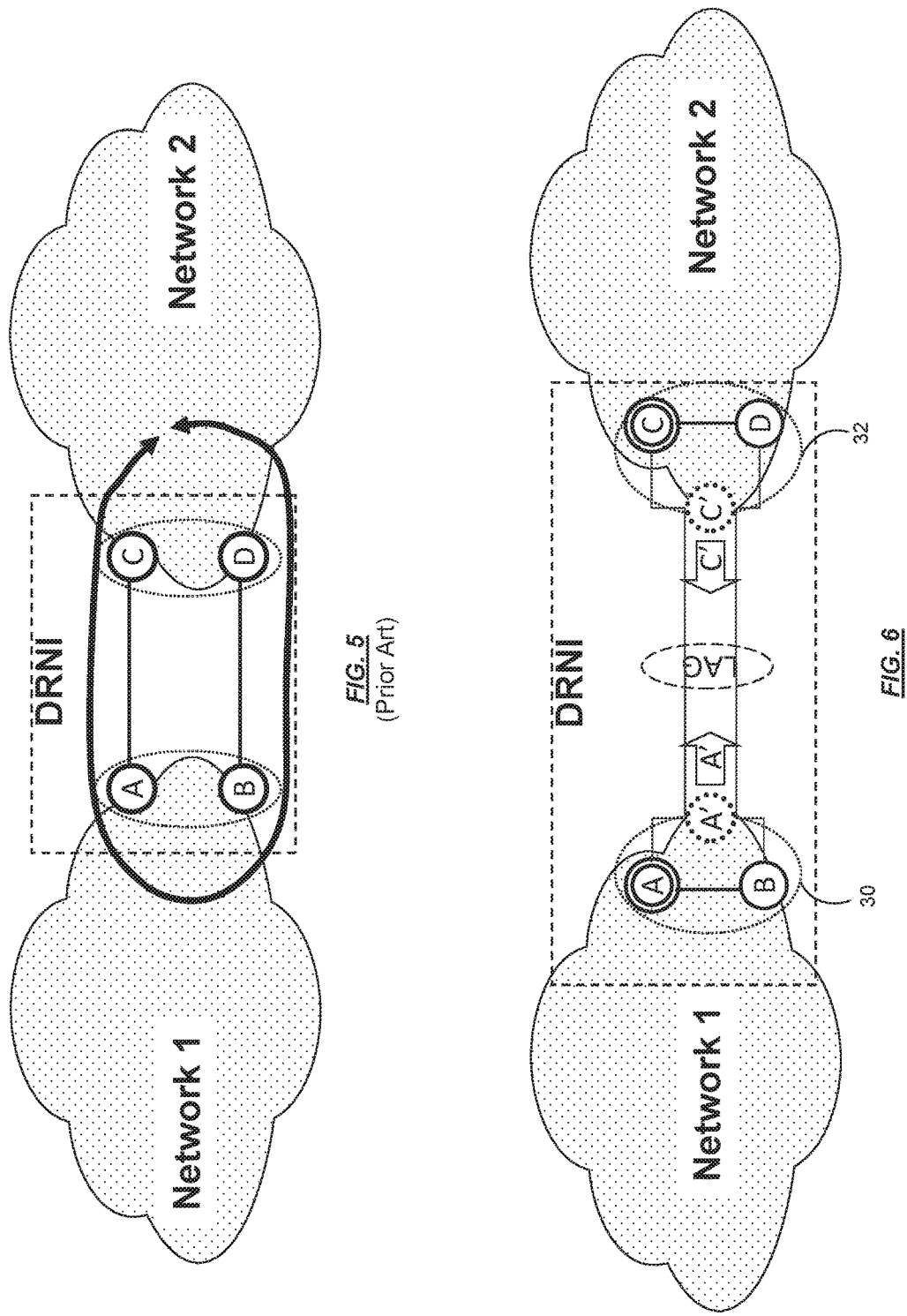

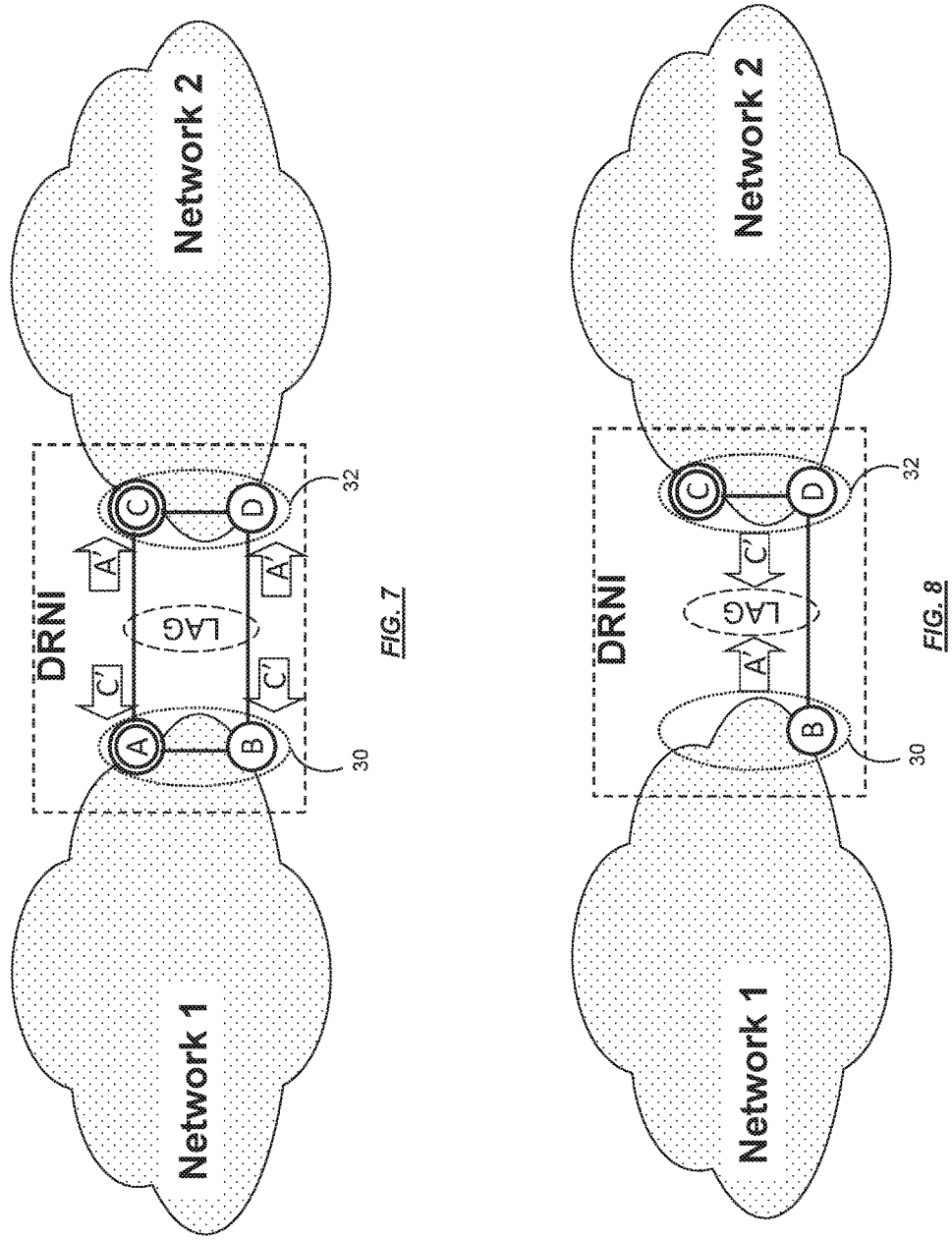

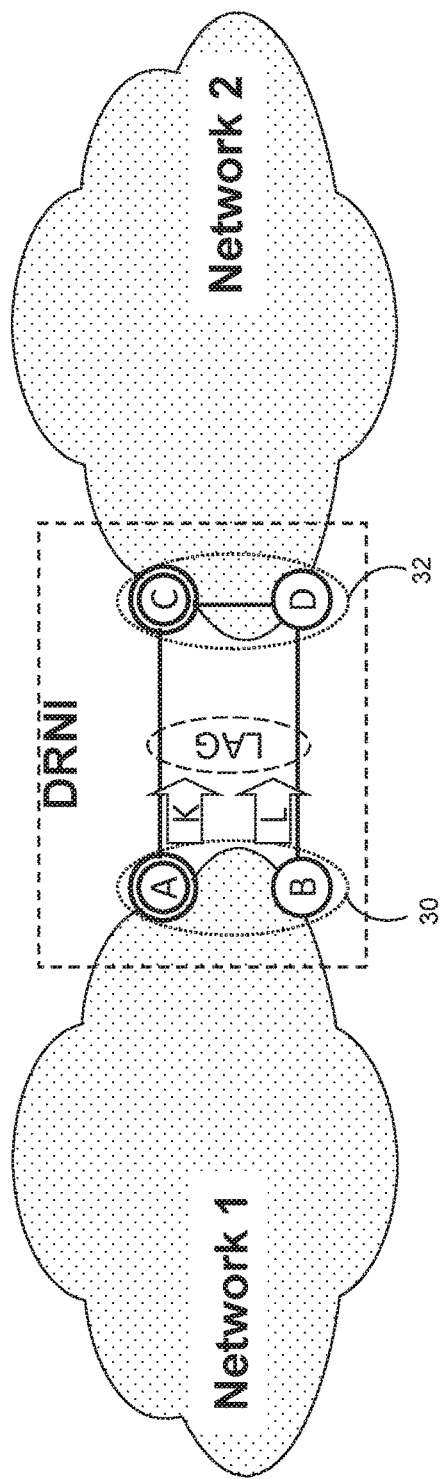
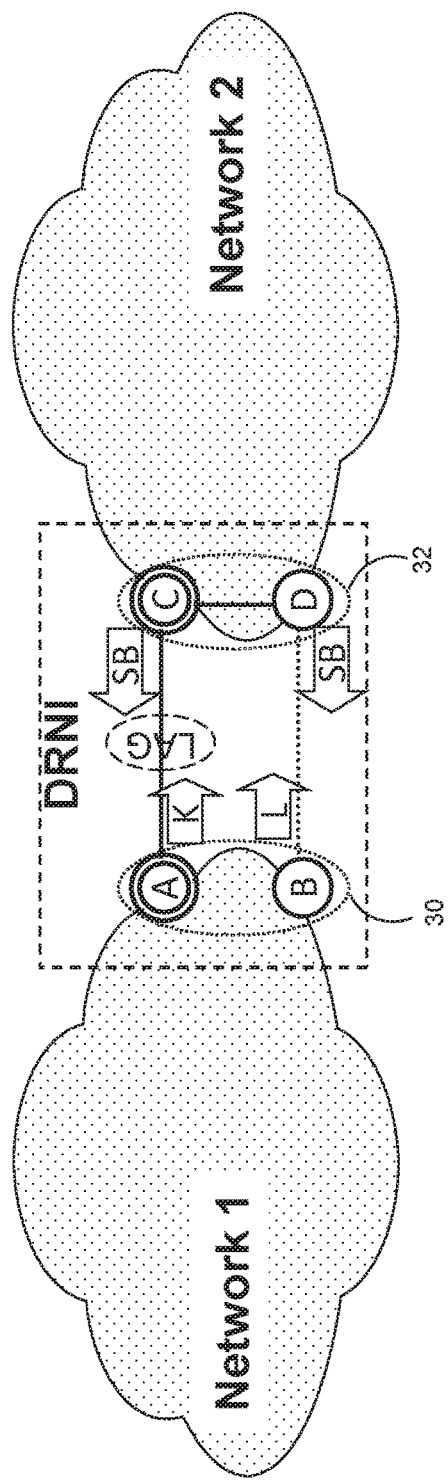
FIG. 12
FIG. 13

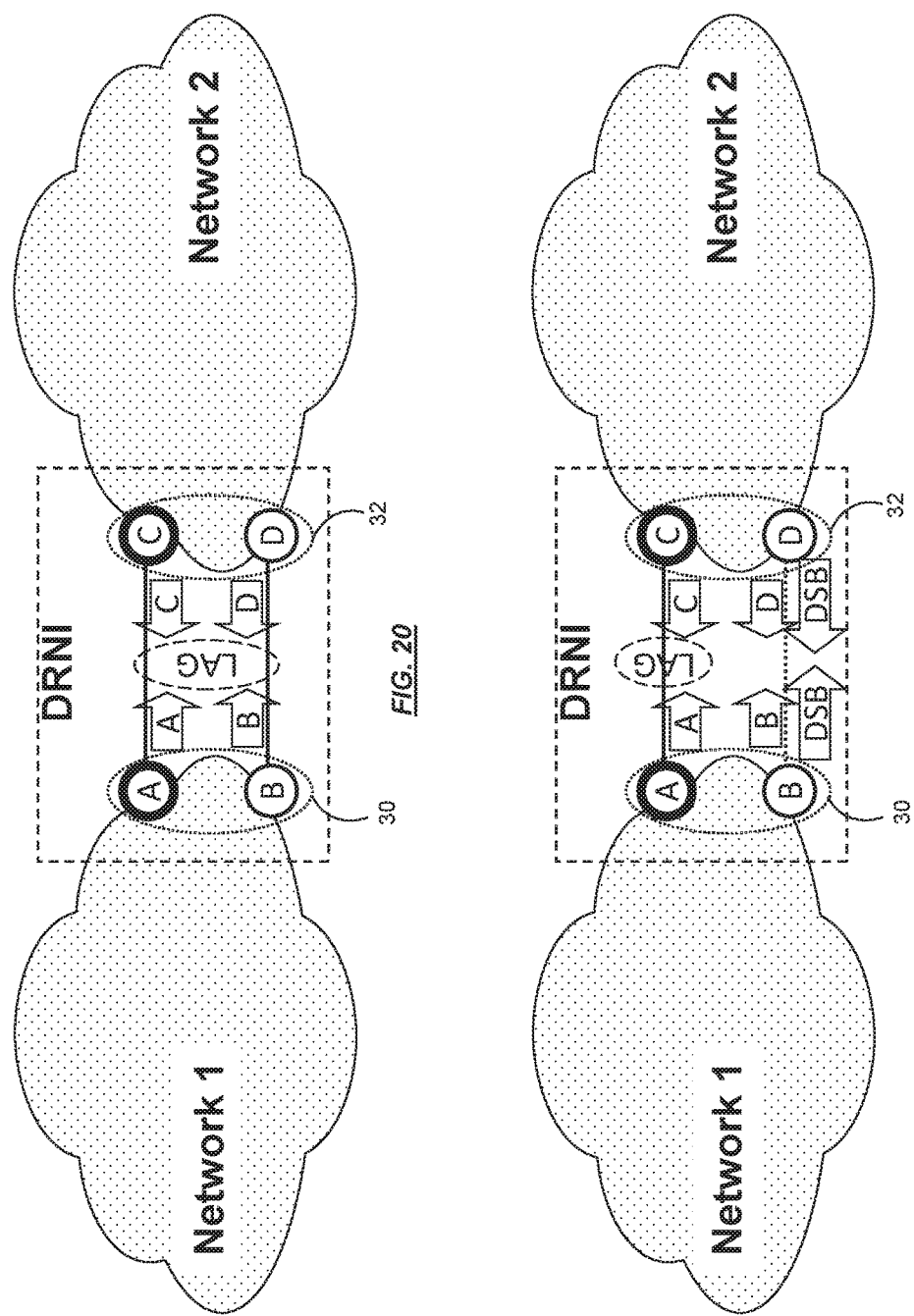

METHODS AND APPARATUS FOR DETECTING AND HANDLING SPLIT BRAIN ISSUES IN A LINK AGGREGATION GROUP

RELATED APPLICATIONS

The present application is a continuation of U.S. patent application Ser. No. 14/400,619, which was filed on Mar. 4, 2015, which is a national stage application of PCT/IB2012/054444, which was filed Aug. 29, 2012, and claims benefit of U.S. Provisional Application 61/647,211, which was filed May 15, 2012, the disclosures of each of which are incorporated herein by reference in their entirety.

TECHNICAL FIELD

The present invention generally relates to link aggregation, and more particularly relates to methods and apparatus for detecting and handling split brain conditions in a Link Aggregation Group.

BACKGROUND

Link Aggregation is widely used to aggregate multiple links between a pair of nodes, in order to be able to transmit user data on each of the links participating a Link Aggregation Group (LAG) (see, e.g., IEEE 802.1AX). Aggregating multiple network connections in this fashion can increase throughput beyond what a single connection can sustain, and/or can be used to provide redundancy in case of a failure of one of the links. The "Distributed Resilient Network Interconnect" (DRNI) (see Clause 8 of IEEE 802.1AX-REV/D0.2) specifies extensions to Link Aggregation in order to be able to use link aggregation on a network interface even between more than two nodes, for example between four nodes A, B, C and D as illustrated in FIG. 1. In FIG. 1 and many of the subsequent figures of this application, the label "DRNI" is used to indicate a LAG that includes the four nodes A, B, C and D.

As shown in FIG. 1, a LAG is formed between Network 1 and Network 2. More specifically, a LAG is formed between LAG virtual nodes 30, 32. First LAG virtual node 30 includes a first node (A) and a second node (B). Second LAG virtual node 32 includes a third node (C) and a fourth node (D). LAG Nodes A and C are connected as peer nodes, and LAG Nodes B and D are also connected as peer nodes. Within virtual node 30, nodes A and B are connected as "fellow nodes," and similarly within virtual node 32 nodes C and D are connected as "fellow nodes." As used in this application, a "LAG virtual node" refers to a DRNI portal in the IEEE documentation discussed above (i.e., two nodes that appear as a single node to their respective peers). Additionally, the statement that virtual node 30 "includes" two nodes A, B means that the virtual node 30 is emulated by the nodes A, B. Similarly, the statement that virtual node 32 "includes" two nodes C, D means that the virtual node 32 is emulated by the nodes C, D.

Multiple nodes participating in the LAG appear to be the same virtual node with a single System ID to their peering partner in the LAG. The System ID is used to identify each node (e.g., node A, node B, node C, node D). The System ID is included in Link Aggregation Control Protocol Data Units (LACPDUs) sent between the individual nodes of the LAG. It is practical to use the System ID of one of the fellow nodes as a common System ID for their corresponding LAG virtual node. Thus, as shown in FIG. 1, node A and node B belong to the same Network 1 and they are part of the same DRNI Portal (i.e., the same LAG virtual node 30), and use a common System ID of "A" for the emulated LAG virtual node 30. Similarly, Nodes C and D of Network 2 are seen as a single LAG virtual node 32 with a System ID "C" by Nodes A and B.

FIG. 1 also shows the DRNI hand-off of a particular service (see bold "service" line in FIG. 1). The service handed-off on an interface may be a Virtual Local Area Network (VLAN), and an identifier for the service may be a VLAN Identifier (VID), such as a Service VID (i.e., "S-VID") (typically identifying services on Network to Network Interfaces (NNIs)) or a Customer VID (i.e. "C-VID") (typically identifying services on User to Network Interfaces (UNIs)). In the example of FIG. 1, the service is handed off on the upper link (between nodes A, C), as both Networks 1 and 2 have selected the upper nodes as "active gateway nodes" and have selected the upper link for the service hand-off. Throughout this application, active gateway nodes are shown as having a bold boundary. This gateway functionality is introduced by DRNI for loop prevention. Thus, the nodes B and D block the service from being handed-off between the DRNI and their own respective networks.

There are different types of failures that have to be handled by the DRNI. One of them is a "portal node failure" illustrated in FIG. 2 ("portal node" and "LAG node" are being used synonymously in this context). As shown in FIG. 2, Node A experiences a failure and can no longer communicate with Node B or Node C. In the prior art, Node B would start to use its own System ID for the LAG instead of the formerly used common System ID, which in the Example of FIG. 1 was the System ID of Node A. Node C is aware of the unreachability of node A, and node D may be aware of it too. Node C and Node D have to accept the new partner System ID (B) in order to provide LAG connectivity. Graceful name change from the old System ID (A) to the new System ID (B) can be applied for smoother transition and for not dropping and re-establishing an active aggregation (see, e.g., N. Finn, Graceful Name Change in LACP, Std. contrib. 2011, http://www.ieee802.org/1/files/public/docs2011/axbq-nfinn-graceful-name-change-0511-v1.pdf).

The behavior illustrated in FIG. 2 is problematic though, because it is based on changing the System ID of the portal based on the System IDs of the individual nodes that comprise the portal. Correspondingly, this prior art solution provides visibility to the individual systems (i.e., Nodes C and D learn that node A has failed), which goes against a main design principle of the DRNI, which is to hide the details of its internal systems that provide an external view of a single LAG virtual node to its peers. Thus, under DRNI principles, it is desirable to avoid System ID change even if a node failure occurs.

FIG. 3 shows another failure event, in the case when connectivity between nodes on the same portal (i.e., the "portal link") is broken, causing the link between fellow Nodes A and B to fail. In the prior art, nodes cannot distinguish between portal link and portal node failures, and Node B's reaction to the portal link failure is the same as to the portal node failure explained above (i.e., Node B starts using its own System ID instead of the common System ID). Nevertheless, Node A is up and running and also uses its own System ID in LACPDUs, which is the same as the common System ID, as illustrated in FIG. 2. Nodes C and D then only maintain the links towards the LAG virtual node 30 that use the common System ID (i.e., the links to Node A in this example). The links to the other node are deactivated by nodes C and D by deactivating the links from LAG as illustrated in FIG. 4 (see dotted line between Node B and Node D—this notation will be used throughout this application to indicate a deactivated link).

The situation caused by the portal link failure of FIGS. 3-4 is referred to as a "split brain" (SB), because both nodes A and B emulating a single LAG virtual node 30 are up and running but not connected to each other. If both of the split brain nodes had become active gateway, then a loop would appear. Nevertheless, the peering partner nodes C and D are able to inform the split brain nodes A and B that they are in a split brain situation as shown by FIG. 4. That is, both nodes C and D use an LACPDU to inform their respective peer node that a split brain situation has occurred at the LAG virtual node 30. Thus, neither of the nodes takes over the active gateway role from the other (e.g., Node B does not become the active gateway for the service of FIG. 1). Note that if the connectivity between nodes C and D works properly, they emulate a single node LAG virtual node 32 and both of them are aware of the different System IDs received from their respective peer nodes A and B.

If a split brain situation appears on both sides of the LAG at the same time, then a "Double Split Brain" (DSB) condition (also known as a "Dual Split Brain") is said to occur (see FIG. 5). If both sides of the LAG are experiencing split brain, then neither LAG virtual node 30, 32 is able to detect the split brain situation of the other LAG virtual node 30, 32, because there is no connection within either portal. Thus the nodes of the same portal cannot notify each other of the fact that they receive different System IDs in their respective LACPDUs, which was the basis of prior art single split brain handling. Therefore, all the nodes will consider their fellow node within the portal to be down, and all the nodes become active gateway for all services. This results in forwarding loop of data frames as illustrated in FIG. 5. No method is available for handling Double split brain situations.

SUMMARY

A number of methods for operating a virtual node in a Link Aggregation Group (LAG) comprising a first virtual node and a second virtual node are disclosed. According to a first exemplary method, a method of operating a virtual node in a LAG including a first virtual node and a second virtual node is disclosed. The first virtual node includes at least a first fellow node and a second fellow node. According to the method, the first fellow node determines whether the first fellow node is in communication with the second fellow node. The first fellow node also transmits control information to the second virtual node based on the determining such that: the control information comprises a system ID and first configuration information associated with the LAG when the determining indicates that the first fellow node is in communication with the second fellow node; and the control information comprises the system ID and second configuration information associated with the LAG when the determining indicates that the first fellow node is not in communication with the second fellow node, the second configuration information being different than the first configuration information.

In one example, the first configuration information and the second configuration information are one of configuration keys and service digests. In the same or another example, the first configuration information and the second configuration information are carried in Link Aggregation Control Protocol Data Unit (LACPDU) messages. A corresponding network node configured to implement the exemplary method is also disclosed.

According to another exemplary embodiment, a method of operating a virtual node in a LAG including a first virtual node and a second virtual node is disclosed. The first virtual node includes at least a first fellow node and a second fellow node. According to the method, the first fellow node receives, from the second virtual node, first control information comprising a system ID and first configuration information associated with the LAG. The first configuration information is compared against reference configuration information associated with the LAG. If the comparison indicates that the first configuration information does not match the reference configuration information, a split brain condition is determined to exist in the LAG in response to at least one of: detecting that the first fellow node is not in communication with the second fellow node; and the second fellow node being in communication with the second virtual node and the first configuration information not matching second configuration information provided to the second fellow node by the second virtual node. The reference configuration represents previously established expected configuration information associated with the LAG.

In one example, the determining that the split brain condition exists includes determining that a dual split brain condition exists in the LAG in response to detecting that the first fellow node is not in communication with the second fellow node. In this example, a non-primary or non-default connecting link that connects the first and second virtual nodes may be excluded from the LAG if a dual split brain condition is determined to exist in the LAG.

In one example, the determining that the split brain condition exists includes determining that a single split brain condition exists in the LAG in response to the second fellow node being in communication with the second virtual node and the first configuration information not matching second configuration information provided to the second fellow node by the second virtual node. The first, second and reference configuration information may be one of a configuration key and a configuration digest. Also, the configuration information may be carried in a Link Aggregation Control Protocol Data Unit (LACPDU) message. A corresponding network node configured to implement this additional exemplary method is also disclosed.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a block diagram illustrating a LAG supporting a service.

FIG. 2 is a block diagram of a portal node failure in a LAG.

FIG. 5 is a block diagram of a double split brain condition.

FIGS. 6-7 are block diagrams of a normal LAG operating state using a novel System ID naming arrangement.

FIG. 8 is a block diagram of a node failure in the LAG of FIGS. 6-7.

FIGS. 12-13 are block diagrams of single split brain handling in the LAG of FIG. 9

FIGS. 20-21 are block diagrams of double split brain handling in a LAG.

DETAILED DESCRIPTION

FIGS. 6-7 illustrate a System ID naming method, where a same node-identifying System ID is used at each LAG virtual node 30, 32. As shown in FIGS. 6-7, Nodes A and B claim to be the single virtual Node A' in LAG virtual node 30 towards Network 2. That is, both Node C and Node D receive LACPDUs such that their partner's System ID is A' as shown in FIG. 6, and they perceive themselves as being connected to a single Node A'. The operation on the other side is the same, as Node C and Node D claim to be a single LAG virtual node 32 toward Network 1, with a System ID of C'. In one example, each virtual node's System ID is same as that of an ID of one of the portal nodes implementing the virtual node. That is, in one example System ID A'=System ID A and System ID C'=System ID C.

According to the principles of DRNI operation, it is desirable to hide the internal operation of a LAG virtual node from its peering network, even in case of failures. FIG. 8 illustrates a block diagram of a node failure in the LAGs of FIGS. 6-7, in which this desired behavior is followed. That is, despite the breakdown of Node A, Node B still uses System ID A' towards the peering network and does not change it to its own. If System ID A'=System ID A, then Node B still uses System ID A towards Network 2 despite the breakdown of Node A. Therefore, the existing split brain handling solution cannot be applied if the DRNI operational principles are aimed to be applied and maintained all the time, as the LAG nodes A, B, C, D in FIGS. 6-7 do not change the System ID they advertise for LAG.

One potential step to minimize the chance of the appearance of a split brain situation is to apply protected links within the portal for the interconnection of the fellow portal nodes (i.e., have protected portal links between A-B, and between C-D). For example, the fellow portal nodes could be connected to each other by multiple physical links grouped by LAG. Other methods that may be used in combination with or as an alternative to this method are described below.

Single Split Brain Avoidance Using Key Change

FIGS. 9-13 illustrate an exemplary method of using key change to detect and address single split brain conditions. In these figures (and in FIGS. 7-8), a double circle around a node indicates that the node is a "primary node" within its respective LAG virtual node 30 or 32.

Figure 3:
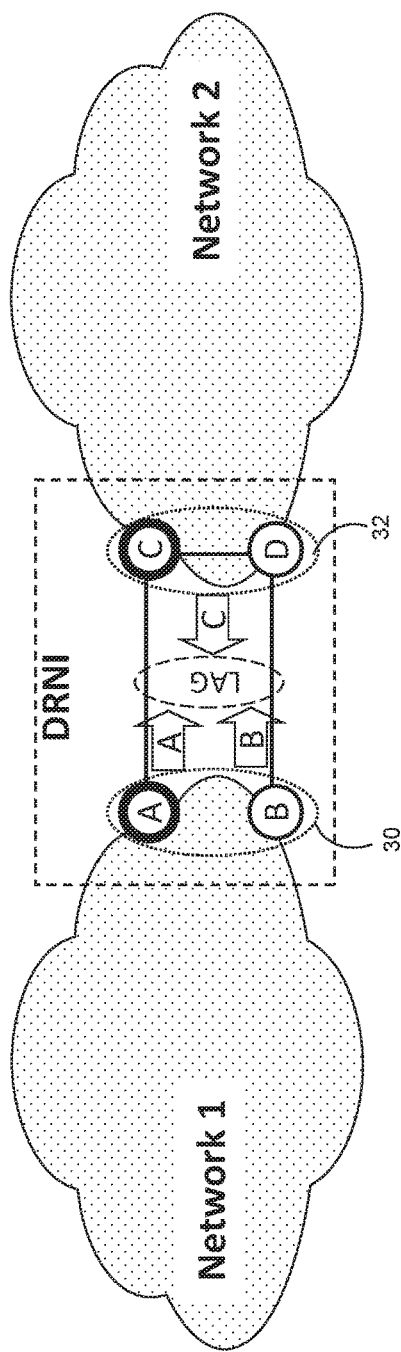
FIG. 3 is a block diagram of a portal link failure in a LAG, causing a split brain condition.
Figure 4:
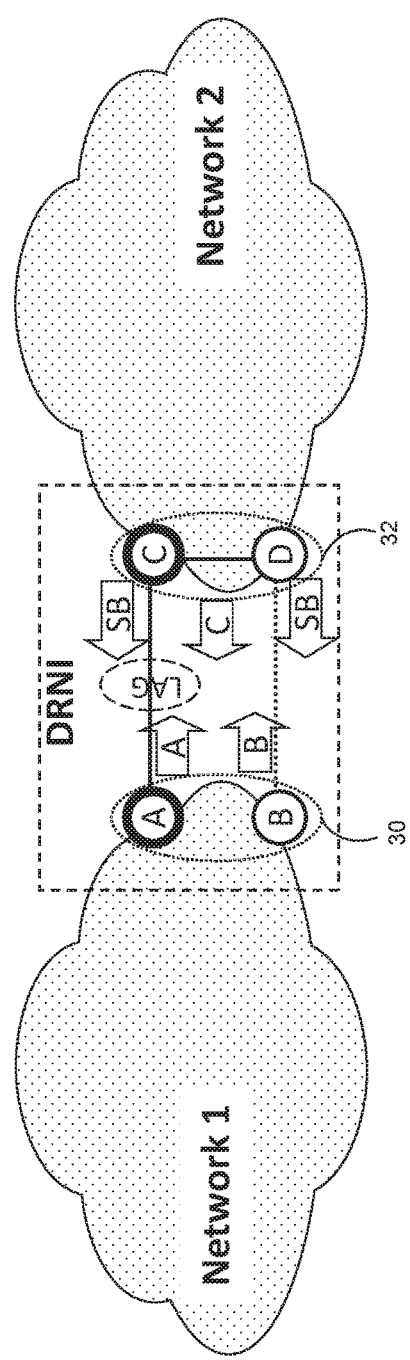
FIG. 4 is a block diagram of a prior art solution for handling the split brain condition of FIG. 3.
Figure 9:
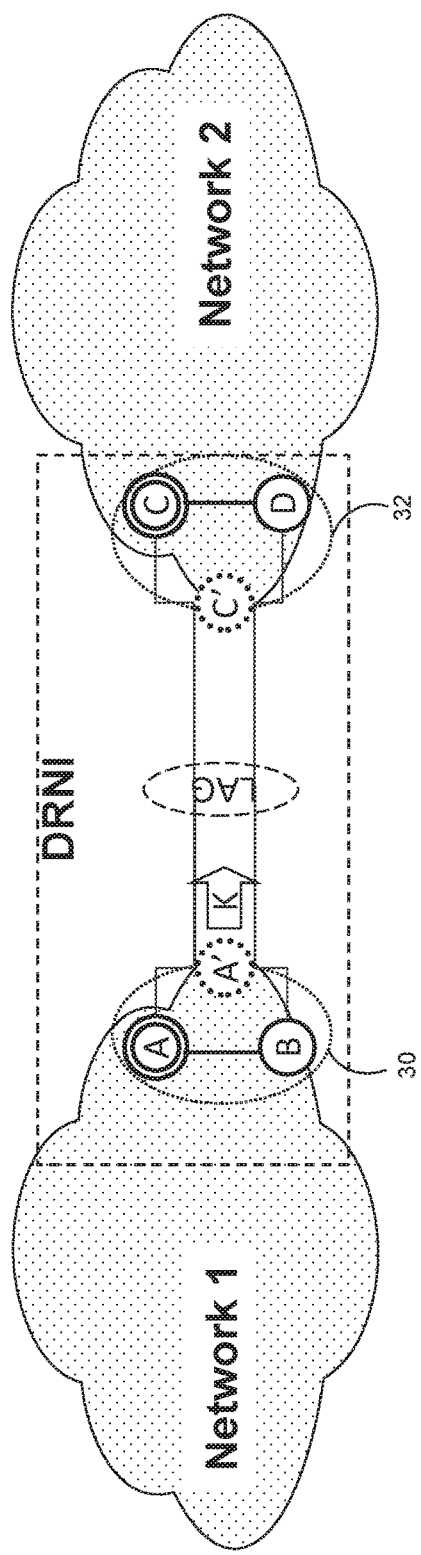
FIG. 9 is a block diagram of a normal operating condition for LAG nodes using a common key.

The method of FIGS. 9-13 is proposed for single split brain handling if System IDs are not changed when failures occur, and they are not changed under any circumstances. The proposed method relies on changing an Aggregation Key if a fellow portal node is perceived to be down. The Aggregation Key (or "Aggregator Key" or "Actor Key" or simply "Key") is used in LACPDUs transmitted between Nodes A and C, and between Nodes B and D. Referring to FIG. 9, in a normal operating condition each of nodes A and B use a key "K" in their transmissions to their peer nodes.

Figure 10:
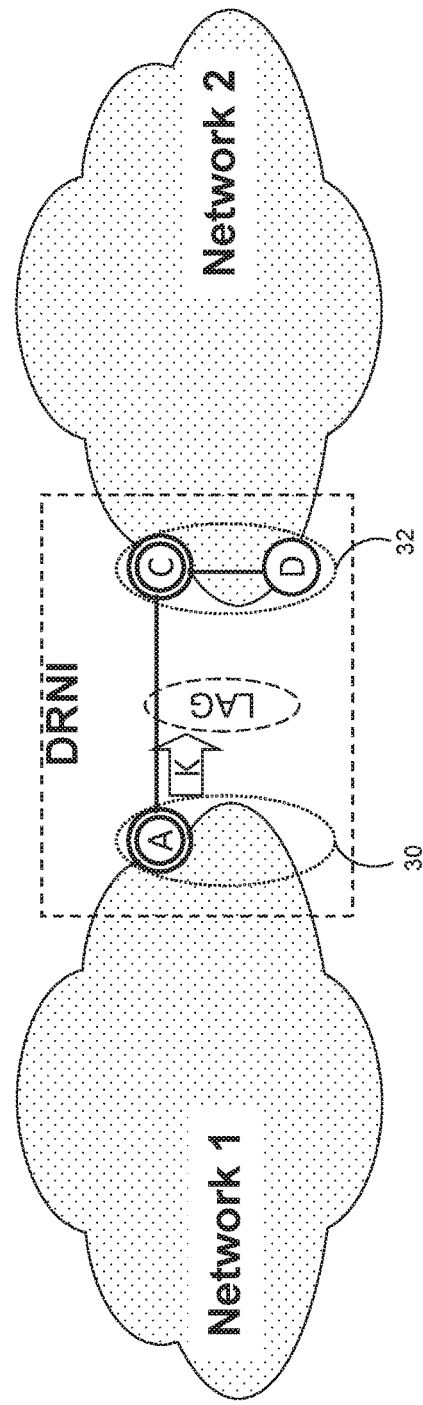
FIG. 10 is a block diagram of a non-primary LAG node failure in the LAG of FIG. 9.

FIG. 10 illustrates a non-primary portal node failure in the LAG of FIG. 9, where node B fails. If the virtual node's System ID is same as the System ID of one of the portal nodes emulating the virtual node, then the node having the common System ID is the primary node (e.g., Node A is primary System ID A'=System ID A). The primary node does not change its Aggregation Key, even if a non-primary node goes down as illustrated in FIG. 10.

Figure 11:
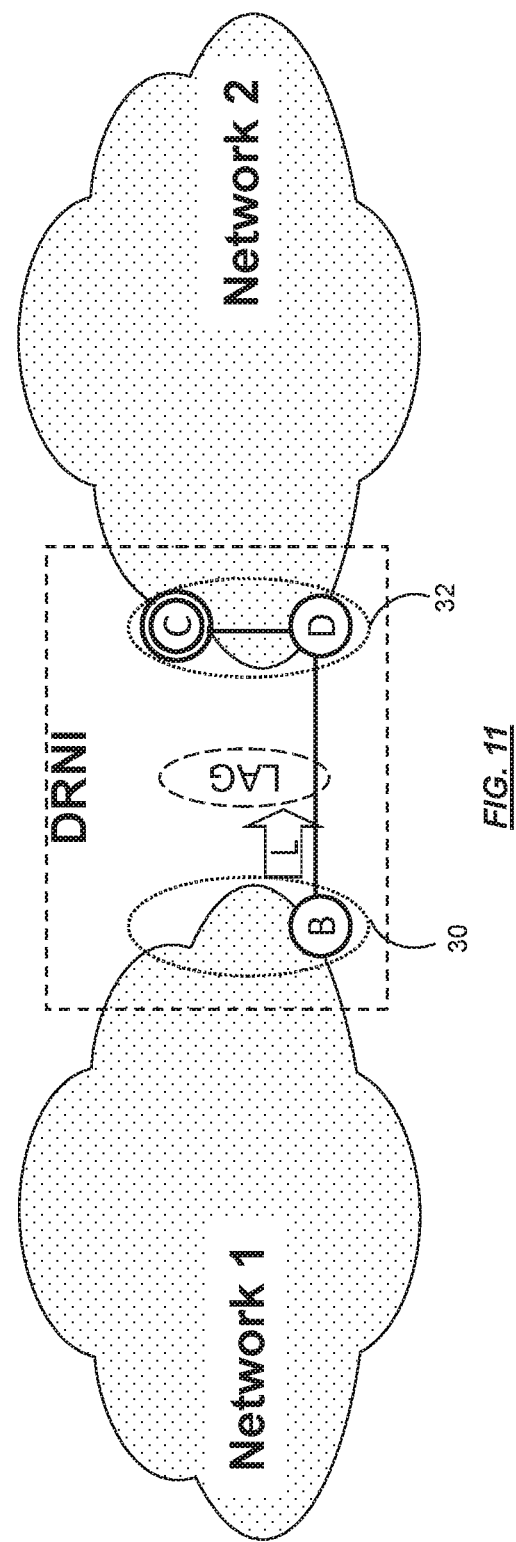
FIG. 11 is a block diagram of a primary LAG node failure in the LAG of FIG. 9.

However, if the primary node A goes down, then the non-primary node B does change its Aggregation Key as shown in FIG. 11. That is, if Node A goes down then Node B changes the key in its LACPDUs to "L" instead of the formerly used common key "K." In order to avoid disruption due to the key change, the old and the new key values may be carried in LACPDUs during the change and for a while after it. Thus the LAG can be maintained if there is a match with either the old or the new key. Notably, the same System ID of A' continues to be used by Node B, despite Node B perceiving Node A as having failed.

The handling of a single split brain condition by key change, according to one exemplary embodiment, is shown in FIGS. 12-13. Referring to FIG. 12, if the connectivity within the portal of virtual node 30 is broken, then both portal nodes A, B perceive that the fellow portal node is down. Neither of Node A or Node B changes its System ID though, as both continue using System ID A' towards their peer nodes C, D. The primary node, (i.e., Node A in the example), also does not change its key and it keeps using the common key "K." In contrast, Node B, which is a non-primary node, changes its key value to key "L."

The peer nodes (Node C and Node D) receive different key values in LACPDUs, and use this to detect that a single split brain has occurred at LAG virtual node 30. The link on which the expected key K is received is kept in the LAG (i.e., the link between nodes A and C). Those links where the received key differs from the expected one are excluded from LAG as shown in FIG. 13 (i.e. the link between B and D is excluded—as shown by the dotted line between B and D).

Note that the difference between the node failure and the split brain conditions is that in the case of a node failure a single key is received by the peer even if the key is changed. However, in the case of a split brain scenario multiple different keys are received. Therefore, the peer is able to recognize a split brain situation and inform the nodes being in split brain about the fact they are in split brain as illustrated in FIG. 13.

Single Split Brain Avoidance Based on Service Assignment Change

FIGS. 14-17 illustrate an exemplary method of using service assignment digests to detect and address single split brain conditions. Notably, in embodiments that incorporate the digests described below, there is no "primary" and "non-primary" node, and thus there are no double circles around any nodes. However, these embodiments utilize the notion of a "default link" and a "non-default link" in a similar fashion.

In certain scenarios (e.g., in cases where LAG congruency is required), information of the actual service assignments to the individual links that are aggregated in a LAG could be carried in the exchanged LACPDUs, in the form of digests (see, e.g., Ericsson provisional patent application Ser. No. 61/605,818, entitled "Method for Ensuring Congruency in Link Aggregation"). In such a configuration, certain services are allocated to specific LAG peer links, and digests are transmitted between LAG nodes to indicate these service assignments. Comparison of the exchanged assignments at the two ends of the LAG enables verification of the congruency of the carried services.

In the following description, a split brain avoidance method relies on detecting change in the service to link assignment (i.e., differences compared to service assignment information expected to be received in a digest). As described below in greater detail, by taking service assignment digests to represent LAG service assignments in LACPDUs, split brain conditions may be detected based on certain digest changes.

Figure 14:
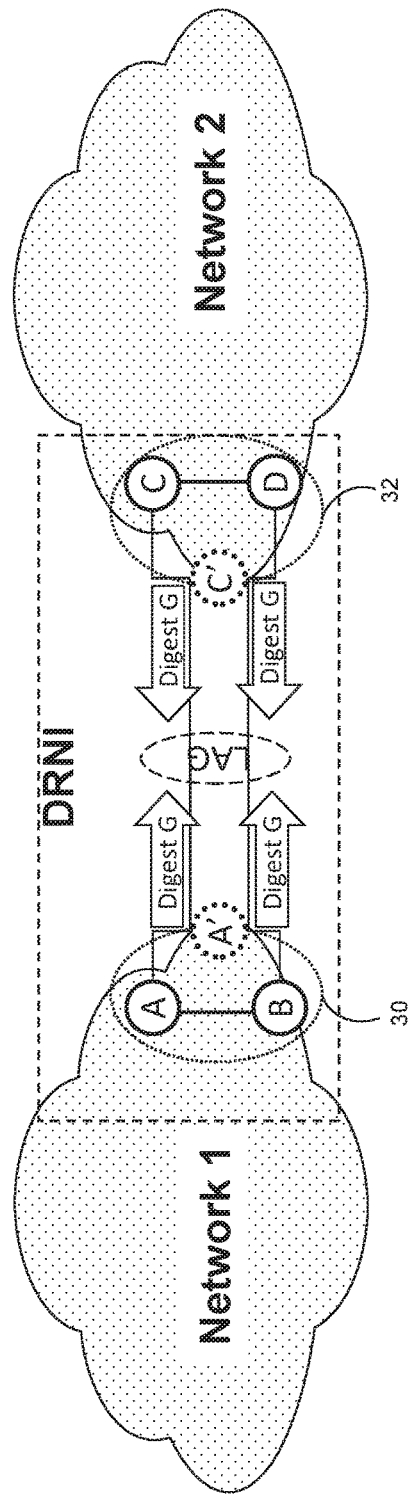
FIG. 14 is a block diagram of a normal operating condition for LAG nodes using service assignment digests.

FIG. 14 is a block diagram of a normal operating condition for LAG that use service assignment digests. Because all links are operational in FIG. 14, a same service assignment is used throughout the LAG, and a same service digest "G" is transmitted between peer nodes in the LAG. That is, on each aggregated link an additional service digest is exchanged carrying the information on, for example, VLAN Identifier (VID) assignments to physical links. As the VIDs are handed-off in a congruent manner, all the digest values are the same and a same service digest "G" is exchanged between both LAG virtual nodes 30, 32 as shown in FIG. 14. The assignment is consistent if a VID is assigned to the same physical link on both sides of the LAG, and the digest covers the assignments of all VIDs. Thus, the same digest is expected to be received as the one that is sent.

Figure 15:
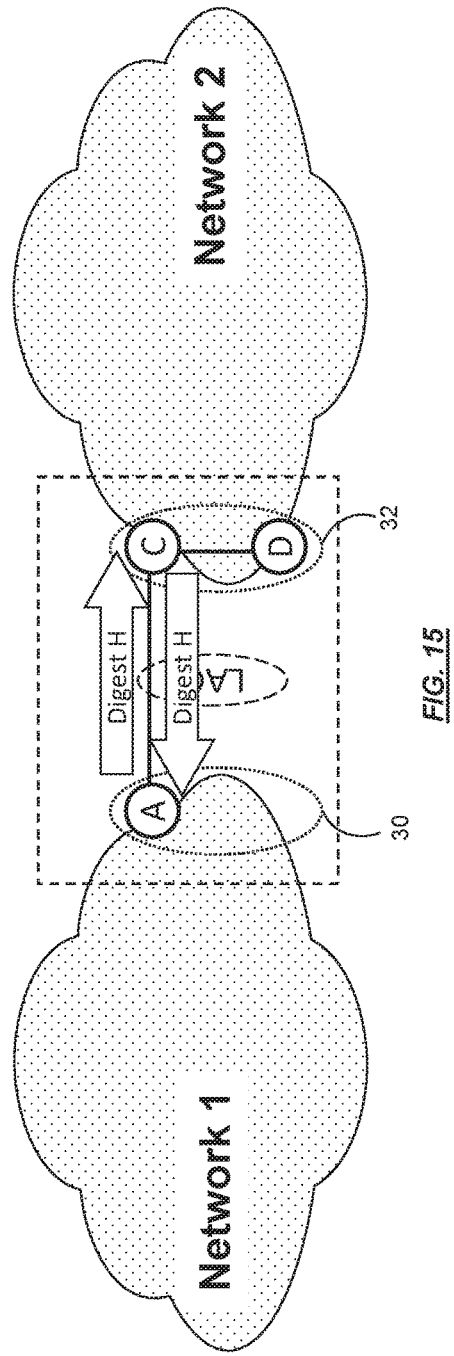
FIG. 15 is a block diagram of a LAG node failure in the LAG of FIG. 14.

FIG. 15 illustrates operation in case of a node failure. In this case all of the services that were carried by peer link B-D are now being carried by peer link A-C. This means a new Digest H will be communicated to Network 2 indicating the service transfer. The LAG virtual node 32 of Network 2 is also aware of the failure because of losing a link of LAG, therefore, virtual node 32 also makes changes in the appropriate arrangements as to move all the services to link A-C and update the digest. Thus the digest exchange becomes as depicted in FIG. 15.

Figure 16:
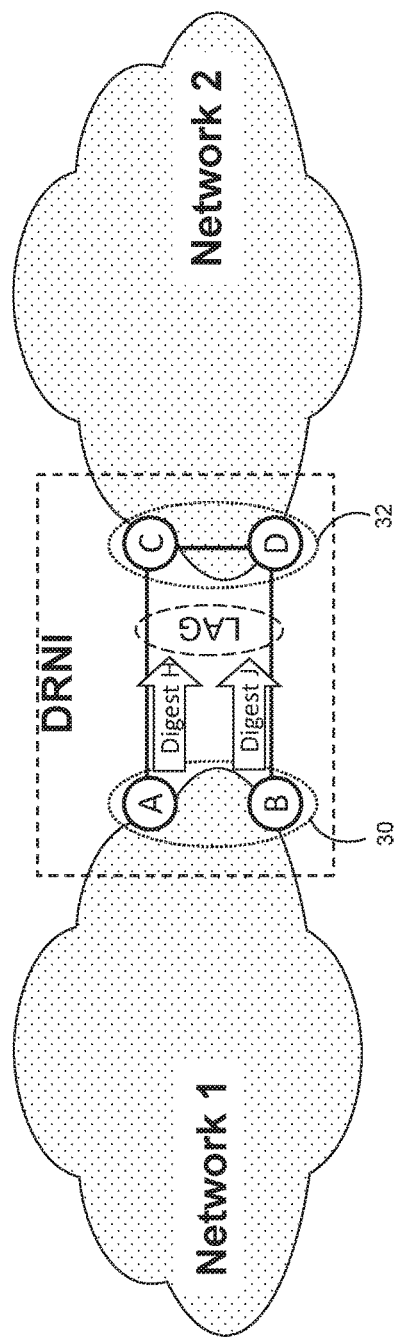
FIGS. 16-17 are block diagrams of single split brain handling in the LAG of FIG. 14.
Figure 17:
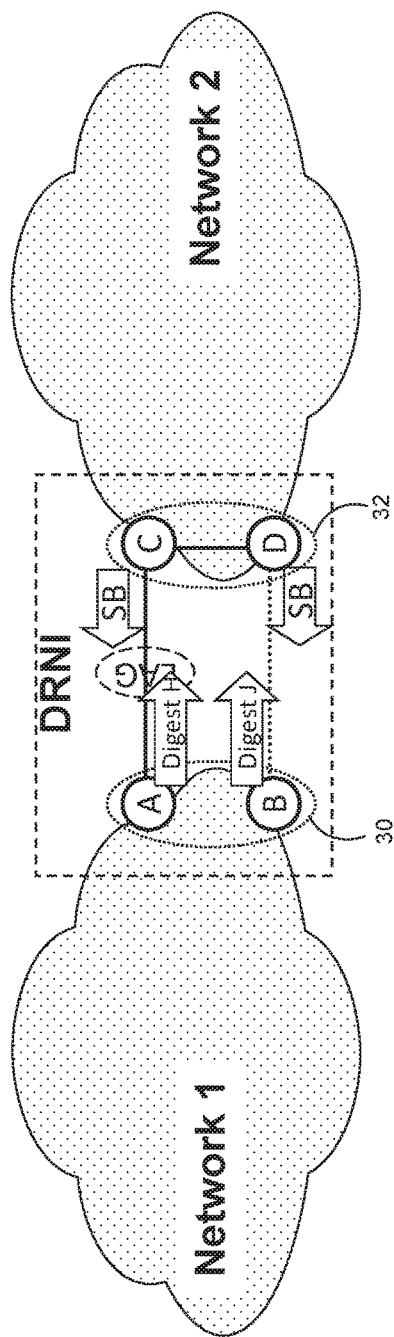

An exemplary method of handling a single split brain condition based on changes in the service assignments is shown in FIGS. 16 and 17. If the connectivity within the portal is broken (e.g., link between Node A and Node B is broken), both portal nodes A and B perceive that their fellow portal node is down. Each of the aggregated links takes over all the services that used to be carried on the other link. As a result, Digest "H" sent by Node A is calculated such that all services are carried over the A-C link. Node B also sends Digest "J" which is calculated such that all services carried over the B-D link. Thus the portal nodes in the split brain send different digests as shown in FIG. 16. Consequently, each of Nodes C and D receive different digests from their peer nodes A and B over the A-C and B-D links. Nodes C and D can use this information to determine that their peer is experiencing a split brain condition, and can take appropriate action so that the LAG is split by separating the lower ID link (i.e., deactivating the "non-default link" between Node B and Node D), and keeping the "default link" in LAG (which is the A-C link between Node A and Node C in the example of FIGS. 16-17). At the same time, Nodes C and D inform their respective peer nodes on A and B about the split brain condition at the LAG virtual node 30 (see "SB" notifications in FIG. 17).

Figure 24:
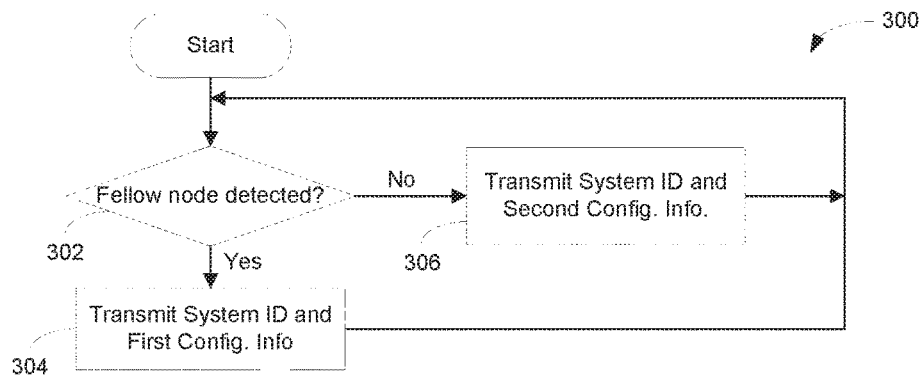
FIG. 24 illustrates an exemplary method of operating a virtual node in a LAG.

With this in mind, FIG. 24 illustrates an exemplary method 300 of operating a virtual node in a LAG comprising a first virtual node (e.g., LAG virtual node 30) and a second virtual node (e.g., LAG virtual node 32). As an example, the method 300 will be described with the "first virtual node" being LAG virtual node 30, which includes at least a first fellow node and a second fellow node (e.g., nodes A and B). The first fellow node determines whether the first fellow node is in communication with the second fellow node (step 302), and transmits control information to the second virtual node based on the determining (steps 304, 306). The control information includes a system ID and first configuration information associated with the LAG when the determining indicates that the first fellow node is in communication with the second fellow node (step 304). The control information comprises the system ID and second configuration information associated with the LAG when the determining indicates that the first fellow node is not in communication with the second fellow node, with the second configuration information being different than the first configuration information (step 306).

As described above, the first configuration information and the second configuration information may be configuration keys and/or service digests. Also, the first configuration information and the second configuration information may optionally but advantageously be carried in LACPDU messages.

Single and Double Split Brain Handling

Figure 18:
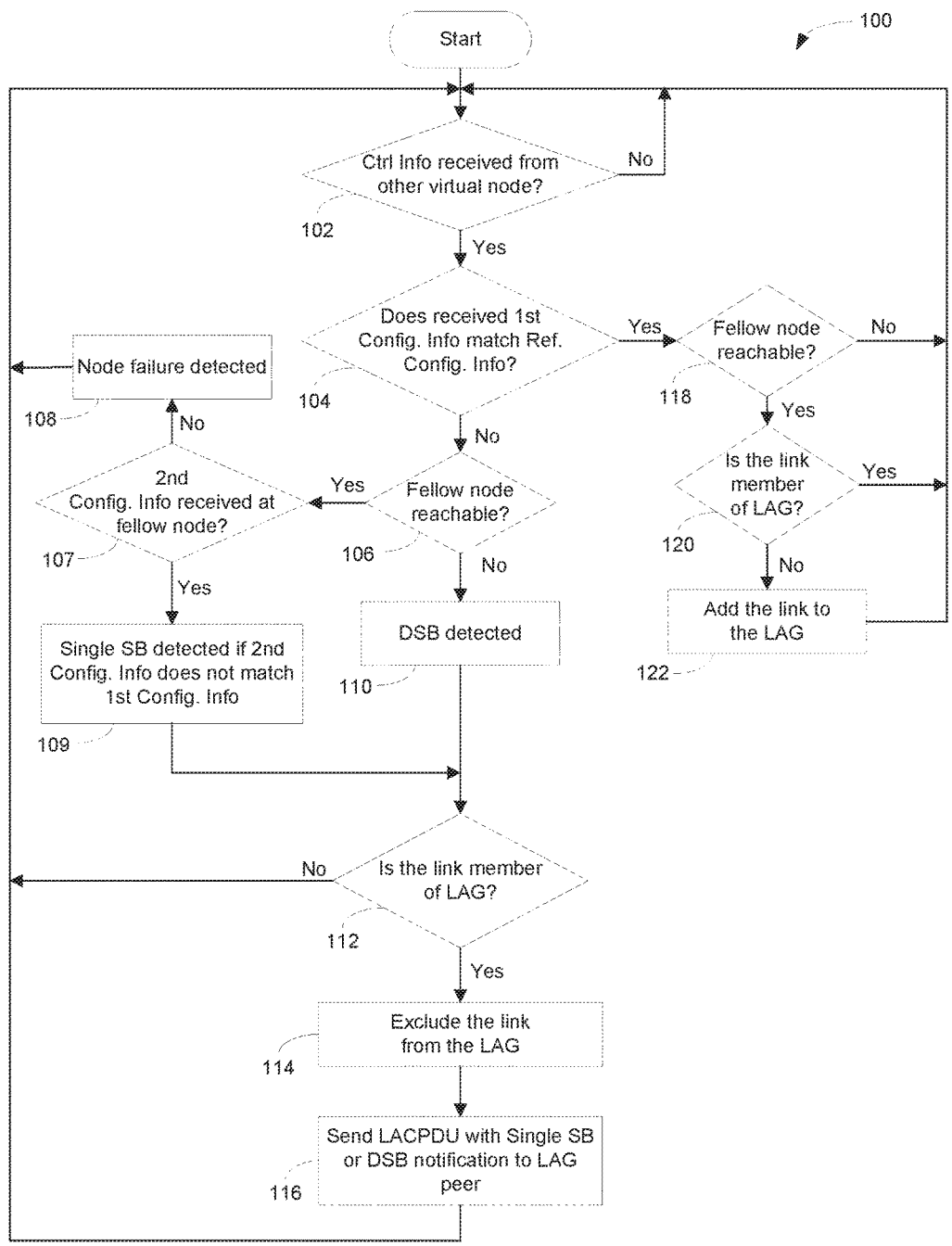
FIG. 18 illustrates an exemplary method of operating a virtual node in a LAG to detect split brain conditions.
Figure 19:
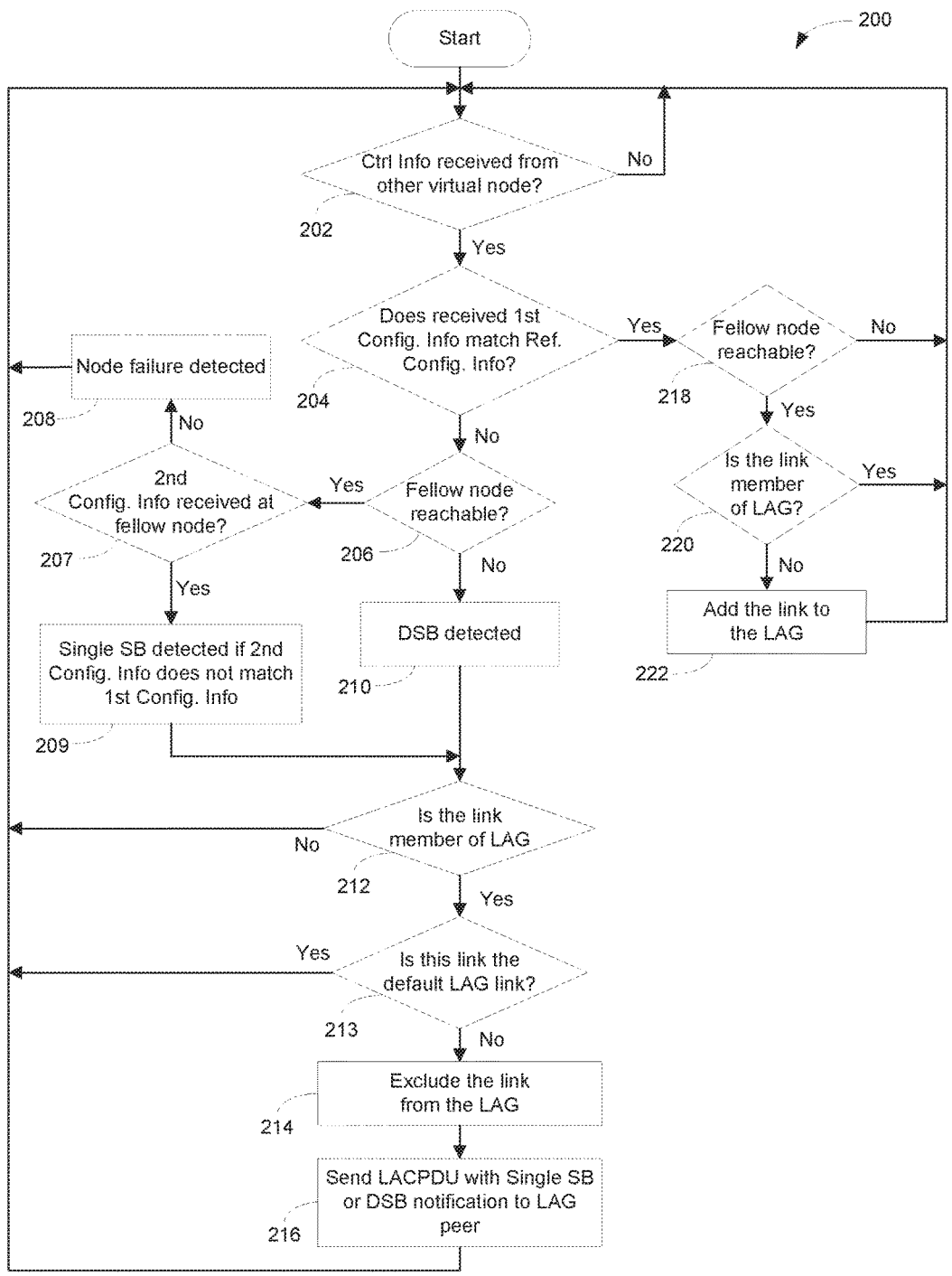
FIG. 19 illustrates another exemplary method of operating a virtual node in a LAG to detect split brain conditions.

FIGS. 18-19 illustrate exemplary detailed methods of operating a virtual node in a LAG to detect split brain conditions. In each embodiment, each LAG node (A, B, C, D) is configured to expect certain information from its LAG peer, and once detected, the double split brain condition may be addressed by excluding a connecting peer link.

FIG. 18 illustrates an exemplary method 100 that facilitates single or double split brain handling, based on the reception of a LACPDU from a peer node. For the sake of example, the method 100 will be described from the standpoint of Node D of LAG virtual node 32.

A check is performed to determine if control information has been received from the other virtual node (e.g. from node 30) (step 102). The information may be received, for example, in a LACPDU. The control information includes a system ID and also first configuration information. A check is performed to determine if the first configuration information matches reference configuration information (step 104). The reference configuration represents previously established expected configuration information associated with the LAG (e.g., an expected key). If the first configuration information does not match the reference configuration information, a check is performed to determine if Node D is able to communicate with its fellow Node C (i.e., whether node C is reachable) (step 106). If Nodes C and D can communicate with each other, then a check is performed to determine if second configuration information is received at fellow Node C (step 107). If the Second Configuration Information is not received after a defined period of time, then it may be determined that peer Node A has failed (step 108). Otherwise, if the Second Configuration Information is received, and does not match the First Configuration Information (e.g., fellow nodes C and D receive different Configuration Information from their peer nodes A and B) then a single split brain condition is determined to have occurred at LAG virtual node 30 (step 109). Based on this, a check is performed to determine if the link in question is still a member of the LAG (step 112). In the example of Node D, this would be the peer link connecting Nodes B and D. If the link is still a member of the LAG, then it is excluded from the LAG (step 114), and a LACPDU with a single SB notification is sent to the LAG peer, which would be Node B (step 116).

Referring again to step 106, if Nodes C and D are unable to communicate with each other, then a double split brain condition is detected (step 110), and steps 112-116 are performed in a similar fashion, except that a DSB notification would be provided in step 116 instead of a single SB notification. Thus, a check is performed to determine if the link in question is still a member of the LAG (step 112), which in the example of Node D would be the peer link connecting Nodes B and D. If the link is still a member of the LAG, then it is excluded from the LAG (step 114), and a LACPDU with a DSB notification is sent to the LAG peer, which would be Node B (step 116). Note that the method proposed here does not modify or spoil the handling of other failure events.

Referring again to step 104, if the expected information is included in the LACPDU, a check is performed to determine if the fellow node is reachable (step 118). Thus, a check is performed to determine if Node D can communicate with Node C. If the nodes C, D can communicate, then a previous double split brain condition no longer exists. A check is therefore performed to determine if the peer link between Node B and Node D is currently part of the LAG (step 120), and if it is not a part of the LAG it is added to the LAG once again (step 122).

Additionally, the prior art single brain method (in which Node B would change its System ID in the event of a failure), and the method 400 (in which a single split brain condition is detected by key change) both work fine with the double split brain handling proposed in the method 100.

Although the method 100 has been described as being implemented by the Node D (with Node D and Node C both expecting the same reference configuration information from their respective fellow nodes), for disabling of the non-primary connecting peer link between Nodes B and D (such that the primary peer link between Nodes A and C would be maintained), it is understood that this is only an example. If the method 100 was also performed by Node C, for example, Node C would still receive its expected information in steps 102-104. This is because Nodes A and C would continue using the same information (e.g., a same system ID and/or key), and it is only Nodes C and D that would be using different information. Therefore, the peer link between Node A and Node C would not be disabled even in the event of a double split brain. In one embodiment, all four of the nodes A, B, C and D perform the method 100 to provide single and double split brain detection at both LAG virtual nodes 30, 32.

As discussed above, the reference configuration information could include an aggregation key, for example, to be used for information verification. The reference configuration information could be determined, for example, by an initial configuration action, or it could be based on the values carried by LACPDU under normal operation (e.g., during initial LACPDU exchanges). In the example of FIG. 9, Nodes C and D are both configured to store the expected key K of their peer. Information mismatch of the method described in FIG. 18 would occur if the key received in the LACPDU differs from the local expected key.

FIG. 19 illustrates an exemplary method of operating a virtual node in a LAG to detect split brain conditions, in which the Configuration Information is a service assignment digest that indicates the assignment of services to physical LAG links. The digest may be received in a LACPDU, and the service digest may differ from an expected service digest. The double split brain handling mechanism in FIG. 18 relies on detection of mismatch in the received and the expected service-to-link assignment.

For the sake of example, the method 200 will also be described from the standpoint of Node D. Steps 202-212 and 214-222 of FIG. 19 are performed in a similar same fashion as steps 102-112 and 214-222 from FIG. 18, except that the expected information corresponds to a service assignment digest (as opposed to a key or System ID). One notable difference between the methods 100, 200 is that an additional step 213 is included in the method 200 for determining whether the LAG peer link in question (e.g., the link B-D connecting Node B and Node D) is the default LAG link. This step ensure that only the non-default link (i.e., that between Nodes B, D) will be deactivated, and the primary link (i.e., that between Nodes A, C) will not be deactivated. Thus, if a split brain situation is anticipated and there is a mismatch in the received and in the expected digest, then the link has to be excluded from the LAG unless it is the default LAG link. In one example, the default LAG link is the link having the numerically lowest link ID value, unless another link is configured as the Default LAG link.

Figure 25:
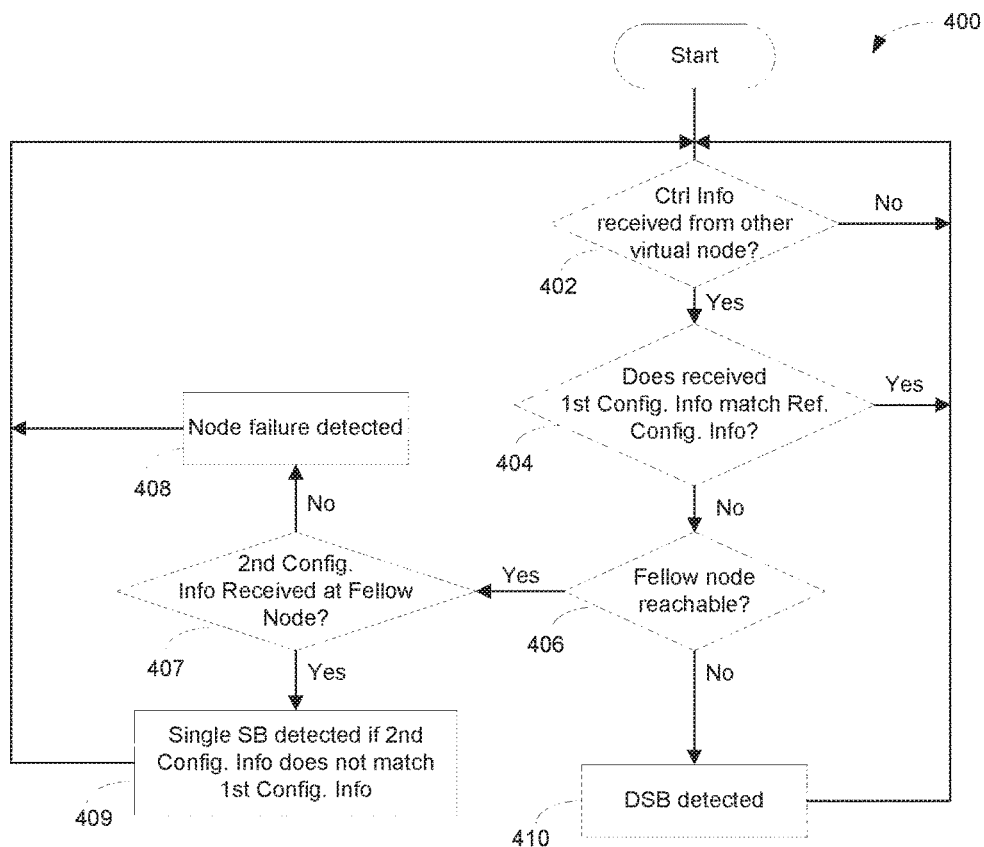
FIG. 25 illustrates another exemplary method of operating a virtual node in a LAG.

While FIGS. 18-19 are illustrated at a greater level of detail, FIG. 25 illustrates a generalized method 400 of operating a virtual node in a LAG comprising a first virtual node and a second virtual node. In the example of the method 400, LAG virtual node 32 is the illustrative "first virtual node" and LAG virtual node 30 will be the illustrative "second virtual node", although these could reversed in different situations. The first fellow node (e.g., node C) receives, from the second virtual node 30, first control information comprising a system ID and first configuration information associated with the LAG (step 402). The first configuration information is compared against reference configuration information associated with the LAG (step 404). If the first configuration information is different (does not match) the reference configuration information (an answer of "no" to step 404), there is a determination of whether the node (node C) is in communication with its fellow node (e.g., node D) (step 406). If not, then a double split brain condition is determined to exist in the LAG (step 410). If the fellow nodes C,D are in communication, then a single split brain condition is determined to exist in response to the second fellow node being in communication with the second virtual node (step 407) and the first configuration information not matching second configuration information provided to the second fellow node by the second virtual node (step 409). Step 408 represents detection of a node failure (e.g., node A). The reference configuration may represent previously established expected configuration information associated with the LAG.

The determining that the split brain condition exists may include determining that a dual split brain condition exists in the LAG in response to detecting that the first fellow node is not in communication with the second fellow node (step 406). In this example, a non-primary or non-default connecting link that connects the first and second virtual nodes from the LAG may be excluded if a dual split brain condition is determined to exist in the LAG.

The determining that the split brain condition exists may include determining that a single split brain condition exists in the LAG in response to the second fellow node being in communication with the second virtual node and the first configuration information not matching second configuration information provided to the second fellow node by the second virtual node (step 407, 409).

In both of the methods 300, 400, the Configuration Information may be either a configuration key or a configuration digest, and may be carried in a Link Aggregation Control Protocol Data Unit (LACPDU) message if desired.

FIGS. 20-21 are block diagrams of double split brain handling in a LAG, based on System IDs, using the method 100. Referring to FIG. 20, the link connecting Node A and Node B has been lost, and Node B starts using a new System ID. Similarly, the connection between Nodes C and D has been lost, and Node D starts using a new System ID. Nodes B and D therefore do not receive their expected information (steps 102, 104). Also, each of Nodes B and D are unable to reach their fellow Nodes A and C, respectively (step 106). Therefore, a double split brain condition is detected (step 110), and a LACPDU with a double split brain indication is sent from Node B to Node D, and a similar LACPDU is sent from Node D to Node B (step 116) (see "DSB" notifications of FIG. 21).

From the standpoint of Nodes A and C, each of these nodes receives the same System ID from their LAG peer (i.e., from each other), that is the locally expected basic System ID. Therefore, the peer link between nodes A and C is kept in the LAG group, and the peer link A-C continuously provides connectivity between Network 1 and Network 2. However, the System ID received in LACPDUs by nodes B and D does not match with the locally expected basic System ID, and Nodes B and C have lost connectivity to their fellow portal node. Therefore, nodes B and D declare a double split brain situation and remove the peer link B-D between them from the LAG group (see steps 112-114 discussed above). Furthermore, Nodes B and D may optionally send a DSB notification to each other (step 116). Note that the removal of the link B-D from the LAG group is a local decision, and does not require any agreement with any other node.

Figure 22:
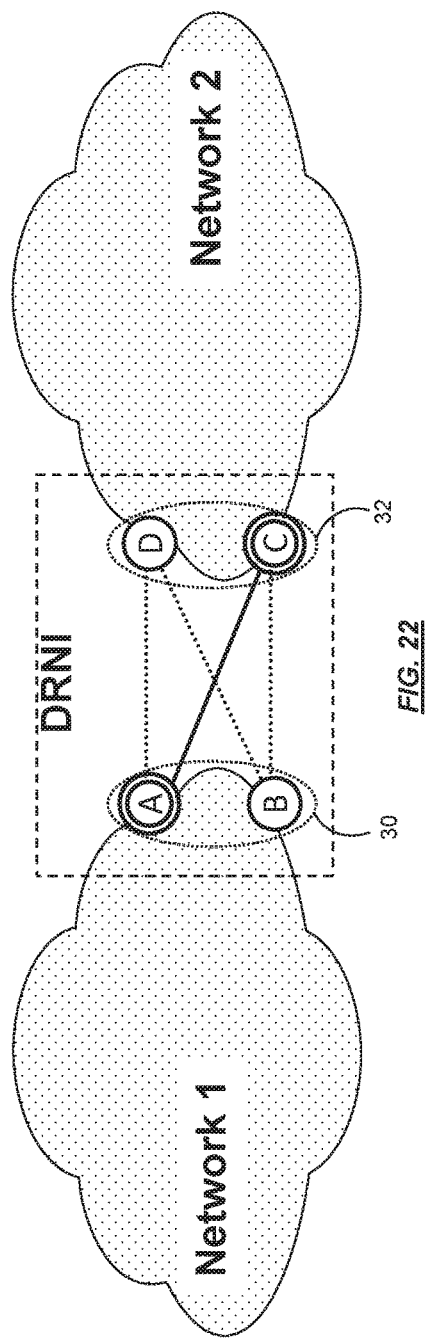
FIG. 22 is a block diagram of double split brain handling in a fully meshed DRNI.

FIG. 22 illustrates the handling of double split rain by the proposed methods 100, 200 in another example, where a full mesh topology is used among the nodes participating in the LAG. In this example, it is only the link between nodes A and C that is kept in the LAG group due to the methods proposed here. All the other links are deactivated by removing them from the LAG group, thus ensuring loop-free connectivity (see dotted lines between the nodes A, B, C, D).

Figure 23:
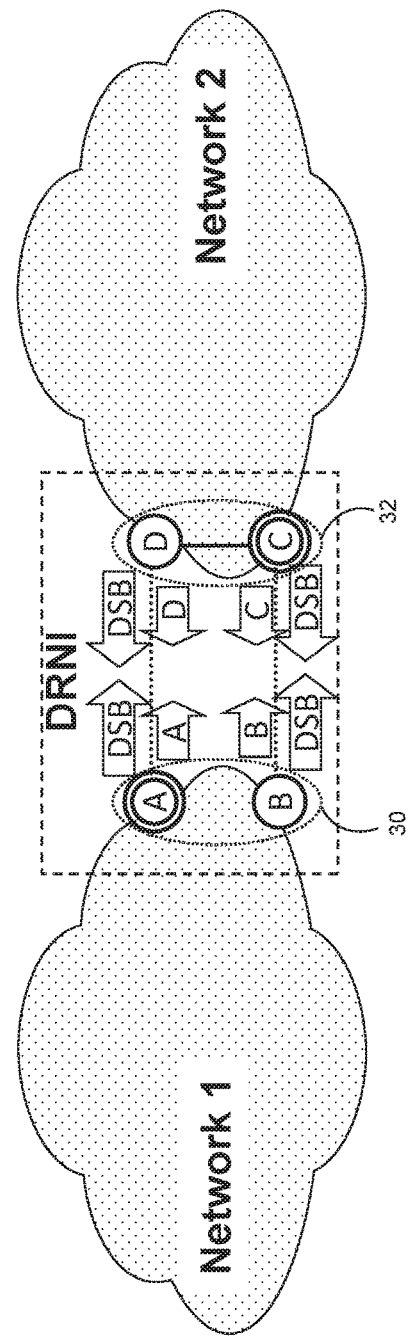
FIG. 23 is a block diagram of broken LAG connectivity due to double split brain mishandling.

Note that if the topology is not a full mesh, then the connectivity formerly provided by the LAG can be broken due to double split brain if the proposed method is applied without careful configuration. In the example double split brain scenario illustrated of FIG. 23, the System ID received in the LACPDUs does not match the locally expected basic System ID in either of the LAG virtual nodes, and neither node can reach its fellow portal node. Therefore, both links are removed from the LAG group, and no connectivity is provided between Network 1 and Network 2. In order to avoid such broken connectivity, and the loops that accompany prior art DSB conditions (see FIG. 5), the nodes A, B and also the nodes C, D may be configured to use a common System ID as discussed above that does not change in the event of failures.

Figure 26:
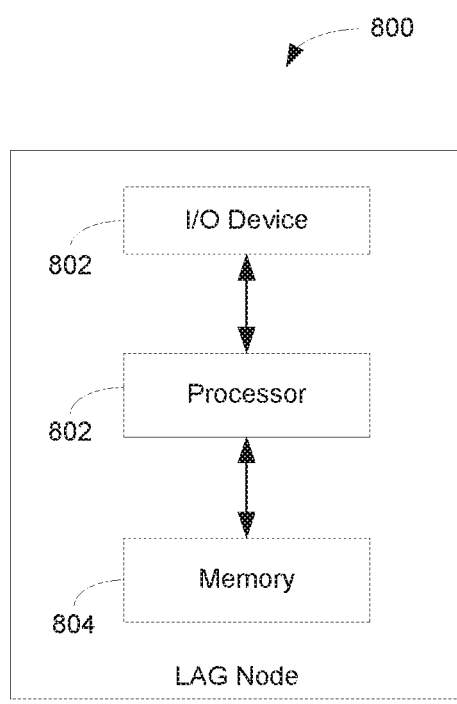
FIG. 26 illustrates an exemplary LAG node.

FIG. 26 illustrates an exemplary LAG node 800 operative to implement the methods described above. The LAG node 800 includes a processor 802 operable to implement one or more of the methods described above. The processor 802 is operatively connected to non-transitory memory 804 and at least one input/output device 806 for communicating with its fellow LAG node (within the same LAG virtual node 30 or 32), and with its peer LAG node (in the remote other LAG virtual node). The memory 804 may be used to store the Configuration Information discussed above, for example. The processor 802 may be implemented by one or more processing circuits (e.g., microprocessors, hardware, firmware, or a combination thereof). The memory 804 may include program instructions for Split Brain Handling, that when run on a LAG node configures the LAG node to perform one or more of the methods described above.

Exemplary Advantages

Some exemplary single split brain handling methods proposed above can avoid changing the System ID in case of any failure event, and can therefore meet DRNI requirements by hiding portal internal details from a LAG peer.

Some exemplary double split brain handling methods proposed above prevent frame looping that would otherwise be caused by a DSB condition in a LAG, where at least four nodes participate in the LAG. Furthermore, the proposed methods do not influence the handling of other failure scenarios.

The foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method of operating a virtual node in a Link Aggregation Group (LAG) comprising first and second virtual nodes, wherein the first virtual node comprises a first fellow node and a second fellow node, the method comprising:
the first fellow node:
transmitting first control information to the second virtual node, the first control information comprising a system ID and first configuration information comprising one of configuration keys and service digests;
determining that the connectivity to the second fellow node is broken; and
transmitting second control information to the second virtual node responsive to determining that the connectivity to the second fellow node is broken, the second control information comprising the system ID and second configuration information that is different than the first configuration information.

2. The method of claim 1 wherein each of the first and second configuration information is associated with the LAG.

3. The method of claim 1 wherein one or both of the first and second configuration information is carried in Link Aggregation Control Protocol Data Unit (LACPDU) messages.

4. A network node configured for use as a first fellow node in a Link Aggregation Group (LAG) comprising first and second virtual nodes, wherein the first virtual node comprises the first fellow node and a second fellow node, the first fellow node comprising:
processing circuitry configured to:
transmit first control information to the second virtual node, the first control information comprising a system ID and first configuration information comprising one of configuration keys and service digests;
determine that the connectivity to the second fellow node is broken; and
transmit second control information to the second virtual node responsive to determining that the connectivity to the second fellow node is broken, the second control information comprising the system ID and second configuration information that is different than the first configuration information.

5. The network node of claim 4 wherein each of the first and second configuration information is associated with the LAG.

6. The network node of claim 4 wherein one or both of the first and second configuration information is carried in Link Aggregation Control Protocol Data Unit (LACPDU) messages.

7. A method of operating a virtual node in a Link Aggregation Group (LAG) comprising a first virtual node and a second virtual node, the first virtual node comprising a first fellow node and a second fellow node, the method implemented at the first fellow node and comprising:
receiving, from the second virtual node, control information comprising a system ID and first configuration information associated with the LAG;
comparing the first configuration information against reference configuration information associated with the LAG; and
responsive to determining that the first configuration information does not match the reference configuration information, determining that a split brain condition exists in the LAG based on one or both of:
a determination that the connectivity between the first fellow node and the second fellow node is broken; and
a determination that the second fellow node is in communication with the second virtual node, and that the first configuration information received from the second virtual node does not match other configuration information provided to the second fellow node by the second virtual node.

8. The method of claim 7 wherein determining that the split brain condition exists comprises determining that a dual split brain condition exists in the LAG responsive to determining that the connectivity between the first fellow node and the second fellow node is broken.

9. The method of claim 8 further comprising excluding a non-primary or non-default connecting link that connects the first and second virtual nodes from the LAG responsive to determining that a dual split brain condition exists in the LAG.

10. The method of claim 7 wherein determining that a split brain condition exists comprises determining that a single split brain condition exists in the LAG based on the second fellow node being in communication with the second virtual node, and that the first configuration information received from the second virtual node does not match other configuration information provided to the second fellow node by the second virtual node.

11. The method of claim 7 wherein the first configuration information is carried in a Link Aggregation Control Protocol Data Unit (LACPDU) message.

12. A network node configured for use as a first fellow node in a Link Aggregation Group (LAG) comprising first and second virtual nodes, wherein the first virtual node comprises the first fellow node and a second fellow node, the first fellow node comprising:
processing circuitry configured to:
receive, from the second virtual node, control information comprising a system ID and first configuration information associated with the LAG;
compare the first configuration information against reference configuration information associated with the LAG; and
responsive to determining that the first configuration information does not match the reference configuration information, determine that a split brain condition exists in the LAG based on one or both of:
a determination that the connectivity between the first fellow node and the second fellow node is broken; and
a determination that the second fellow node is in communication with the second virtual node, and that the first configuration information received from the second virtual node does not match other configuration information provided to the second fellow node by the second virtual node.

13. The network node of claim 12 wherein to determine that a split brain condition exists, the processing circuitry is further configured to determine that a dual split brain condition exists in the LAG responsive to determining that the connectivity between the first fellow node and the second fellow node is broken.

14. The network node of claim 13 wherein responsive to determining that a dual split brain condition exists in the LAG, the processing circuitry is further configured to exclude a non-primary or non-default connecting link that connects the first and second virtual nodes from the LAG.

15. The network node of claim 12 wherein to determine that a split brain condition exists, the processing circuitry is further configured to determine that a single split brain condition exists in the LAG responsive to detecting that the second fellow node is in communication with the second virtual node, and that the first configuration information does not match other configuration information provided to the second fellow node by the second virtual node.

16. The network node of claim 12 wherein the first configuration information is carried in a Link Aggregation Control Protocol Data Unit (LACPDU) message.

* * * * *

UNITED STATES PATENT AND TRADEMARK OFFICE
CERTIFICATE OF CORRECTION

PATENT NO. : 9,906,411 B2  
APPLICATION NO. : 15/463292  
DATED : February 27, 2018  
INVENTOR(S) : Farkas et al.

Page 1 of 1

It is certified that error appears in the above-identified patent and that said Letters Patent is hereby corrected as shown below:

In the Drawings

In Fig. 26, Sheet 15 of 15, delete "  " and insert -- -- , therefor.

In the Specification

In Column 1, Line 9, delete "2015," and insert -- 2015, now Pat. No. 9,602,348, --, therefor.

In Column 2, Line 13, delete "User to" and insert -- User --, therefor.

In Column 10, Line 24, delete "ensure" and insert -- ensures --, therefor.

Signed and Sealed this  
Fifteenth Day of May, 2018

Andrei Iancu  
*Director of the United States Patent and Trademark Office*